Jan. 28, 1958 W. E. SCHOBER 2,821,402
LATHE TOOL HOLDER
Filed Oct. 4, 1954 2 Sheets-Sheet 1
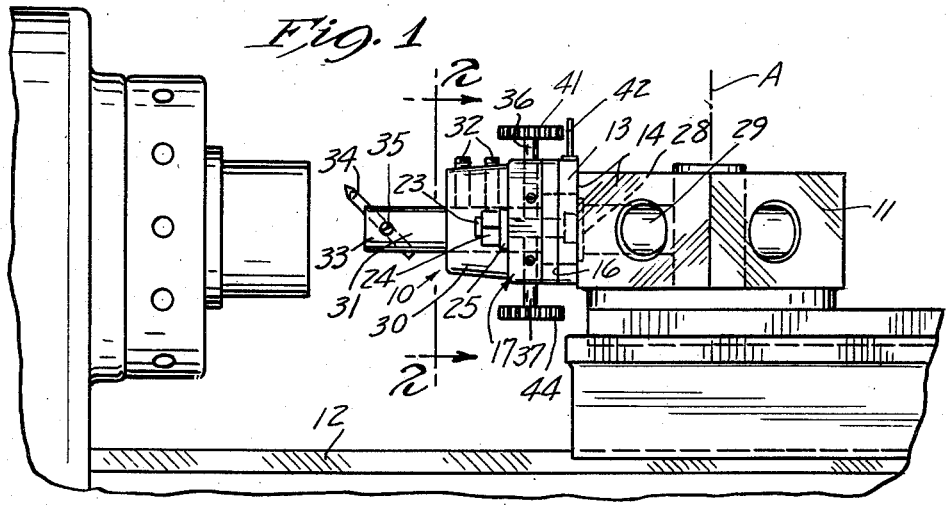
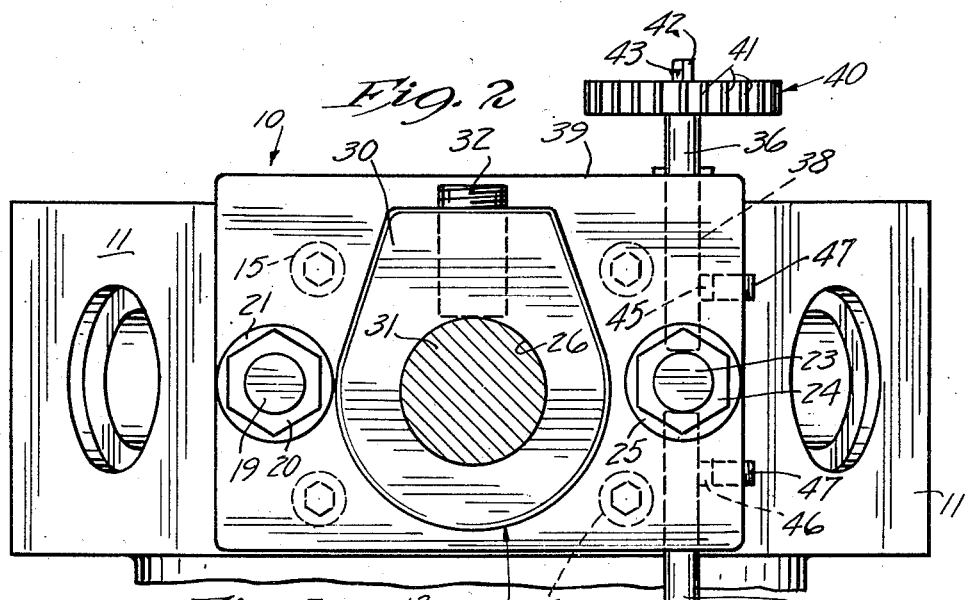
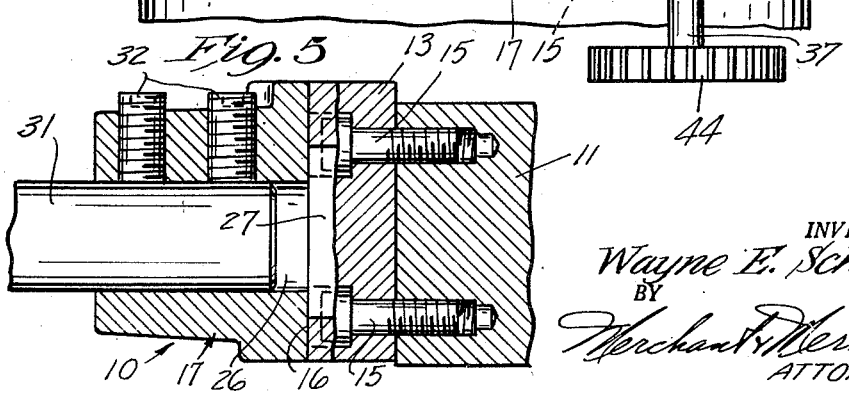
INVENTOR.
Wayne E. Schober
BY
Merchant & Merchant
ATTORNEYS Jan. 28, 1958  W. E. SCHOBER  2,821,402
LATHE TOOL HOLDER
Filed Oct. 4, 1954  2 Sheets-Sheet 2
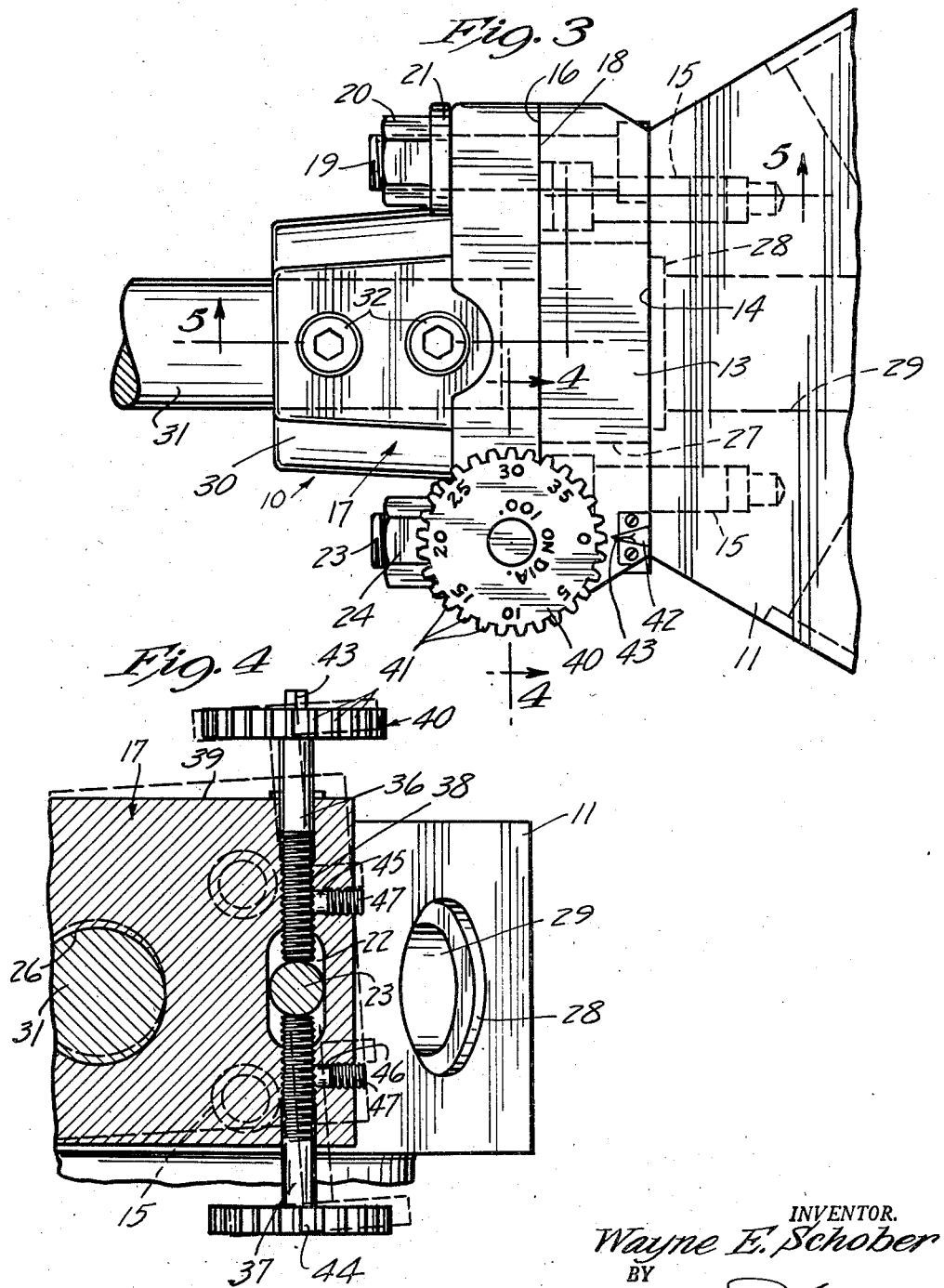
INVENTOR.
Wayne E. Schober
BY
Merchant & Merchant
ATTORNEYS

United States Patent Office 2,821,402
Patented Jan. 28, 1958

2,821,402

LATHE TOOL HOLDER

Wayne E. Schober, Minneapolis, Minn., assignor to Peter A. Rasmussen, Minneapolis, Minn., doing business as Viking Tool and Die Company, Minneapolis, Minn.

Application October 4, 1954, Serial No. 459,975

2 Claims. (Cl. 279—6)

My invention relates to an improved lathe tool holder adapted to provide a precise adjustment of the tool bit radially toward and away from the axis of the work. More specifically, it relates to a tool holder adapted to be mounted on the turret lathe which provides a precise adjustment of the tool bit in a plane parallel to the pivotal axis of the turret.

It is an object of my invention to provide an improved lathe tool holder adapted to be mounted on the turret of a turret lathe for a precise adjustment of the tool bit in a plane generally parallel to the pivotal axis of the turret, which holder is compact, easily operated, and adapted to provide a precise error-free adjusting of the tool bit.

It is another object of my invention to provide an improved lathe tool holder with a precise generally vertical adjustment which eliminates consequential slack or lost motion between the parts thereof.

It is another object of my invention to provide a novel and improved lathe tool holder comprising a pair of oppositely disposed adjusting screws whereby the critical adjustment of the tool bit is effected by determinate increments of movement of one of said adjusting screws, which is the tool bit mover, only in one direction, which eliminates slack or lost motion between the adjusting screw and the movable tool bit holder.

These and other objects and advantages will be disclosed in the course of the following specification and claims, reference being had to the accompanying drawings, wherein:

Fig. 1 is a fragmentary view in side elevation showing my novel and improved tool holder secured to the turret of a turret lathe;

Fig. 2 is an enlarged fragmentary view, partly in front elevation and partly in section, taken substantially on the line 2—2 of Fig. 1;

Fig. 3 is a fragmentary view in top plan of the structure shown in Fig. 2;

Fig. 4 is a fragmentary view in vertical section, taken substantially on the line 4—4 of Fig. 3, showing two positions of my novel and improved tool holder; and Fig. 5 is a slightly reduced view in vertical section taken substantially on the line 5—5 of Fig. 3.

Referring more particularly to the drawings, wherein like parts are indicated by the same numeral:

My novel and improved tool holder is indicated in its entirety by the numeral 10. As particularly shown in Fig. 1, tool holder 10 is adapted to be attached to the turret 11 of a conventional turret lathe, indicated by the numeral 12.

Tool holder 10 comprises a mounting member or backplate 13, which is secured to one of the faces 14 of the turret 11 by means of the countersunk machine screws or bolts 15. It will be understood that mounting member 13, in place of being directly bolted to the turret 11, as preferably shown herein, may be attached to any intermediate structure wherein it may be secured to the turret 11. Mounting member 13 defines a generally vertically disposed surface 16, which is substantially parallel to and generally forwardly disposed of the face 14 of the turret 11. A supporting head 17 is disposed adjacent the vertical surface 16 and has a vertical surface 18 contiguous thereto in relatively slidably movable relationship therewith in a plane parallel to the pivotal axis A of the turret 11. Preferably, a generally horizontally disposed bolt 19 extends between mounting member 13 and supporting head 17 to secure the latter to the former for relative pivotal movements about a horizontal axis. Bolt 19 extends generally forwardly through supporting head 17 and is threaded to receive a self-locking nut 20. A washer 21 is positioned between supporting head 17 and nut 20. Supporting head 17 has a generally horizontally disposed, preferably vertically extended, slot 22, see particularly Fig. 4, formed therein, and extending therethrough between mounting member 13 and supporting head 17 for relative movement therein in a plane parallel to the pivotal axis A, is a second bolt 23. Bolt 23 is disposed in relatively fixed relation with respect to supporting member 13 and is in laterally spaced parallel relationship with bolt 19. Like bolt 19, bolt 23 extends generally forwardly through supporting head 17 and is threaded to receive a self-locking nut 24. A washer 25 is disposed between nut 24 and supporting head 17. It is clear that supporting head 17 is limited in its pivotal movement about bolt 19 to the extent of relative movement of bolt 23 within slot 22.

Supporting head 17 is provided with a central bore 26, which is coaxially aligned with a central bore 27 formed in mounting member 13, which is in coaxial alignment with enlarged opening 28 and bore 29 extending into turret 11. Supporting head 17 has formed therewith a generally forwardly projecting boss 30 which surrounds and defines a rim about the major portion of bore 26. Boss 30 is disposed between bolts 19 and 23 and projects from supporting head 17 in a direction parallel to bolts 19 and 23, which is generally normal to the vertical surfaces 16 and 18. Bore 26 is adapted to receive a generally horizontally disposed forwardly projecting shaft 31, which is releasably held in position by set screws 32 extending through the boss 30, as particularly shown in Fig. 5. Shaft 31 at its outer end 33 is adapted to receive a generally upwardly forwardly projecting tool bit 34, which is adjustably held in position by a set screw 35.

Bolt 23 is adapted to define an abutment, which is engageable by a pair of oppositely disposed adjusting screws 36 and 37, which are screw threaded into tapped holes 38 from oppositely disposed outer surfaces 39 of the supporting head 17 into slot 22. Adjusting screws 36 and 37 are adapted for relative longitudinal movements toward and away from bolt or abutment 23 in a plane parallel to the pivotal axis A of turret 11, and as preferably shown, extend generally vertically. Adjusting screw 36 is provided with a generally horizontally positioned cylindrical head 40, which is graduated by uniformly circumferentially spaced teeth 41. The distance between adjacent teeth 41 defining a determinate generally vertical movement of the shaft 31 equal to $\frac{1}{1000}$ of an inch. An index 42 is secured to mounting member 13 and extends generally vertically upwardly to dispose a reference line 43 adjacent the graduated head 40 of adjusting screw 36, which is adapted to indicate the adjustment of screw 36. The adjusting screw 37 is provided with a head 44, which is indicated in the drawings to be graduated in a manner similar to head 40; however, the movement of adjusting screw 37 is generally not critical, as is the case with adjusting screw 36 and, therefore, head 44 may be of any suitable shape to provide a handle for easily turning the screw 37. A pair of friction blocks 45 and 46 are in frictional engagement with each of the adjusting screws 36 and 37, respectively, and are adjustable by means of the laterally inwardly projecting set screws 47.

The operation of my novel and improved tool holder 10 is as follows:

When supporting head 17 is in the position shown in full lines in Fig. 4, bolt 23 is centrally disposed with respect to vertically extended slot 22 and the axis of shaft 31 is substantially in alignment with the axis of rotation of the work to be bored. Although tool holder 10 may be used in cutting an outside diameter as well as a bore, the operation hereof will be specifically explained insofar as it applied in cutting the bore. To cut the precise bore diameter required means the tool bit 34 must be accurately radially outwardly moved with respect to the axis of rotation of the work, and this is accomplished by the precise adjustment of my tool holder 10 in a generally vertically upwardly direction. When it is desired to move tool holder 10 generally vertically upwardly, adjusting screw 37 is backed away from the abutment defined by the bolt 23 and adjusting screw 36 is moved the desired distance, as indicated by teeth 41 and index 42, in a seemingly downwardly direction to pivot supporting head 17 about bolt 19 generally vertically upwardly to raise shaft 31 and tool bit 34 the precise desired distance, as is generally indicated in dotted lines in Fig. 4. After supporting head 17 has been raised generally vertically the desired distance, adjusting screw 37 is then moved upwardly to be again in engagement with the abutment defined by bolt 23.

It is clear that adjusting screw 36, during successive cuts of any one boring operation, is always moved in the same direction to actuate the radially outward movement of tool bit 34 and is never backed off in the opposite direction during the same boring operation. Therefore, during any one boring operation, the external threads of screw 36 will always be in the same relationship with the internal threads of hole 38 with which it is associated. Adjusting screw 36 is always retained in close, unyielding contact with supporting head 17, and there is no slack or lost motion to introduce error in the tool bit adjustment. Thus, it is clear that my novel and improved tool holder 10 is adapted to provide precise generally upwardly vertical movements of the tool bit 34 and that it eliminates error due to slack or lost motion which is generally found in tool bit holders now known and used for the same purpose as my invention.

The provision of the movement of tool holder 10 in a plane parallel to the pivot axis A of turret 11, preferably as shown in a vertical plane, minimizes any error in the indexing of the turret 11, whereby if the radial movement of the tool bit 34 with respect to the axis of the work were at right angles to the axis A, any error in indexing turret 11 would directly effect and be released as an error in the adjustment of the tool bit 34.

Further, it is an advantage and objective of my invention that it is an easily operated tool holder, which is commercially practical and yet is capable of providing a precise and error-free adjustment of the tool bit.

My invention has been built and tested and found to be a precise and effective tool holder attachment and to accomplish the aforementioned objectives. It will be obvious to anyone skilled in the art that my invention may be modified by many substitutions and equivalents and that this disclosure is intended to be illustrative only. Therefore, I intend to be limited solely by the scope of the appended claims.

What I claim is:

1. A lathe tool holder adapted to provide a precise generally vertical adjustment of a tool bit comprising a mounting member adapted to be secured to the turret of a turret lathe, a supporting head having a generally horizontally disposed slot formed therein and extending therethrough, a pair of elongated generally horizontal laterally spaced parallel fastening members extending between said mounting member and said supporting head one extending through said slot whereas for connecting said supporting head to said mounting member for pivotal movement about the axis of the other of said fastening members within the limits permitted by the engagement of said one fastening member with opposite ends of said slot, and a pair of oppositely disposed generally vertically extending adjusting screws being screw threaded into said supporting member for relative longitudinal movements toward and away from said one fastening member and engaging said one fastening member to positively releasably anchor said supporting head in position, whereby the position of said supporting head may be precisely adjusted by said adjusting screws with no lost motion.

2. A lathe tool holder adapted to provide a precise vertical adjustment of a tool bit comprising a mounting member adapted to be secured to the turret of a turret lathe and defining a generally vertically disposed surface substantially parallel to and forwardly of said turret, a supporting head defining a generally flat face contiguous to said surface in relatively slidably movable relationship therewith and having a forwardly projecting boss which defines a generally central bore adapted to receive a tool bit supporting shaft, said supporting head having a generally horizontally disposed slot formed therein and extending therethrough at one side of bore, a pair of elongated generally horizontal laterally spaced parallel fastening members extending between said mounting member and said supporting head one extending through said slot whereas for connecting said supporting head to said mounting member for pivotal movement about the axis of the other of said fastening members within the limits permitted by the engagement of said one fastening member with opposite ends of said slot, and a pair of oppositely disposed generally vertically extending adjusting screws being screw threaded into said supporting member for relative longitudinal movements toward and away from said one fastening member and engaging said one fastening member to positively releasably anchor said supporting head in position, whereby the position of said supporting head may be precisely adjusted by said adjusting screws with no lost motion.

References Cited in the file of this patent

UNITED STATES PATENTS

| | | |
|---|---|---|
| 75,872 | Davison | Mar. 24, 1865 |
| 984,000 | Hull | Feb. 14, 1911 |
| 1,935,493 | Wellington | Nov. 14, 1933 |
| 2,369,875 | Wanelik | Feb. 20, 1945 |
| 2,460,689 | Gillette | Feb. 1, 1949 |